(12) United States Patent
Perdon et al.

(10) Patent No.: US 11,425,925 B2
(45) Date of Patent: Aug. 30, 2022

(54) PROCESS OF STABILIZING AND SPRAYING A FOAM TO MIMIC THE APPEARANCE OF FROSTING

(71) Applicant: Kellogg Company, Battle Creek, MI (US)

(72) Inventors: Alicia Antonio Perdon, Battle Creek, MI (US); Zarini Muhammad-Tahir, Kalamazoo, MI (US); Eric Homan, Portage, MI (US); Joseph George, Bellevue, MI (US)

(73) Assignee: Kellogg Company, Battle Creek, MI (US)

( * ) Notice: Subject to any disclaimer, the term of this patent is extended or adjusted under 35 U.S.C. 154(b) by 167 days.

(21) Appl. No.: 16/265,349

(22) Filed: Feb. 1, 2019

(65) Prior Publication Data

US 2019/0230974 A1   Aug. 1, 2019

Related U.S. Application Data

(60) Provisional application No. 62/625,102, filed on Feb. 1, 2018.

(51) Int. Cl.
| | | |
|---|---|---|
| *A23P 20/18* | (2016.01) | |
| *A23G 3/34* | (2006.01) | |
| *A23L 7/122* | (2016.01) | |

(52) U.S. Cl.
CPC .............. *A23P 20/18* (2016.08); *A23G 3/343* (2013.01); *A23L 7/122* (2016.08); *A23V 2002/00* (2013.01)

(58) Field of Classification Search
CPC ..... A23G 3/343; A23G 2220/02; A23P 20/18; A23L 7/122; A23V 2002/00

USPC ........................................................ 426/302
See application file for complete search history.

(56) References Cited

U.S. PATENT DOCUMENTS

| | | |
|---|---|---|
| 2,846,314 A | 8/1958 | Aichele et al. |
| 3,592,663 A | 7/1971 | Brunner et al. |
| 4,431,682 A | 2/1984 | Smith et al. |
| 4,856,453 A | 8/1989 | Verrico |
| 5,030,460 A | 7/1991 | Baggerly |
| 5,102,680 A * | 4/1992 | Glass ............... A23D 7/0053 426/572 |
| 5,529,800 A | 6/1996 | Boums et al. |
| 6,565,909 B1 | 5/2003 | Huang et al. |
| 8,475,863 B2 | 7/2013 | Perry et al. |

(Continued)

FOREIGN PATENT DOCUMENTS

| | | | |
|---|---|---|---|
| GB | 453417 A * | 9/1936 | ............ A23G 3/346 |
| GB | 1511392 | 5/1978 | |

(Continued)

OTHER PUBLICATIONS

PCT/US2019/016337 International Search Report dated Apr. 9, 2019.

*Primary Examiner* — Subbalakshmi Prakash
(74) *Attorney, Agent, or Firm* — Honigman LLP; Kathryn D. Doyle, Esq.; Jonathan P. O'Brien

(57) ABSTRACT

A system and method for applying a reduced sugar coating to a food product is provided using a natural whitening system. The methods include preparing a foam and then maintaining that foam through a spray nozzle to coat a food product with a spray-applied foam that mimics the appearance of a high sucrose frosting or icing.

8 Claims, 2 Drawing Sheets

(56) References Cited

U.S. PATENT DOCUMENTS

Figure 1:
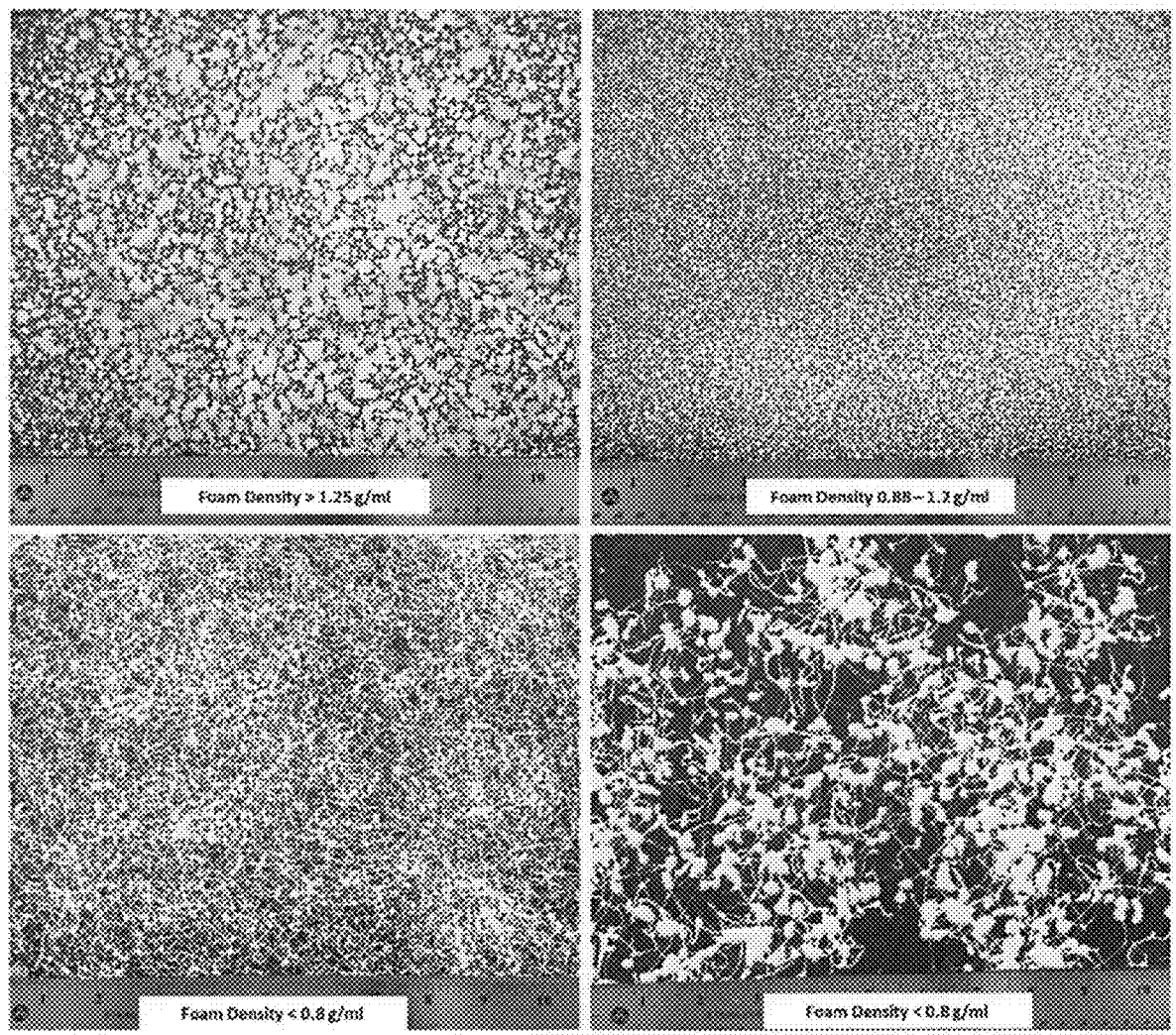

| | | | |
|---|---|---|---|
| 9,603,384 B2 | 3/2017 | Kaliappan et al. | |
| 2006/0233933 A1* | 10/2006 | Berry | A23G 9/325 |
| | | | 426/570 |
| 2009/0214741 A1 | 8/2009 | Atapattu et al. | |
| 2011/0045158 A1 | 2/2011 | Perry et al. | |
| 2014/0178535 A1 | 6/2014 | Riddell et al. | |
| 2015/0223486 A1 | 8/2015 | Seibold et al. | |
| 2015/0320075 A1* | 11/2015 | Medhekar | A23P 20/105 |
| | | | 426/93 |
| 2017/0238562 A1 | 8/2017 | Johnson et al. | |

FOREIGN PATENT DOCUMENTS

| | | | |
|---|---|---|---|
| GB | 1511392 A * | 5/1978 | A23L 7/122 |
| WO | 2014100539 | 6/2014 | |
| WO | 2015134374 | 9/2015 | |

\* cited by examiner

PROCESS OF STABILIZING AND SPRAYING A FOAM TO MIMIC THE APPEARANCE OF FROSTING

CROSS-REFERENCE TO RELATED APPLICATION

This application claims the benefit of U.S. Provisional Application No. 62/625,102 filed Feb. 1, 2018, the entirety of which is hereby incorporated herein by reference

FIELD

The present disclosure relates generally to a method for applying a reduced sugar frosting to a food product, and more particularly, to a method for preparing a reduced sugar foam and applying the reduced sugar foam to a food product in a manner to maintain a foam integrity through a spray nozzle to mimic the appearance of a traditional high-sugar frosting.

BACKGROUND

Consumers often desire food products, such as breakfast cereals, that are lower in sugar content while providing many of the same organoleptic characteristics, such as taste, texture, and/or appearance as traditional sugar-coated products. Some food products, such as breakfast cereals, may include a sugar-based coating or frosting that is often central to the taste, texture, and/or appearance of the food. The sugar, in this regard, often provides a role beyond mere sweetness in the food system. That is, with sugar-coated or iced products, the sugar often contributes to the white, frosted appearance, which may, in some instances, affect consumer taste-acceptance of the product.

Consumer acceptance of foods is often a complex mix of many organoleptic characteristics including taste, mouthfeel, perception, smell, and other objective and subjective factors. For instance, a pleasantly tasting food may not be accepted by consumers if the color or appearance of the food suggests otherwise. Consumer appearance of a frosted or iced product, to suggest another example, may be one of the drivers of sweetness perception and likeness of the product with some consumers. The desired white or opaque coating of frosted products, such as in ready-to-eat (RTE) breakfast-type cereals, may be due in part to a diffraction of light hitting crystalized sugar in the frosting or coating. Thus, while reducing the level of sugar in the coating may be beneficial to consumer demands for lower sugar-content foods, simply lowering the sugar content can be problematic with other likeness factors because of the sugar's role in providing more than just sweetness to the food. Reducing sugar can negatively affect the white, opaque appearance that consumers come to expect in a frosted or iced product due to a decreased level of sugar crystals to provide light defraction. A less white or opaque coating may then negatively affect perception of the product even if the product meets consumer desires for lower sugar content.

SUMMARY

In one embodiment or approach, a process for producing a sugar coated food product or comestible with a frosted-like coating is provided. In some aspects, the frosted-like coating has a reduced sugar content, such as about 50 to about 60 percent less sugar that prior frostings. The process includes first preparing a frosting solution including sucrose, a foaming agent, a stabilizing agent, and water. The frosting solution is then whipped to generate a foamed frosting solution having a foam overrun and density thereof. The foamed frosting solution is then sprayed through a spray nozzle onto the surface of a food or comestible and the integrity of the foam is maintained through the spray nozzle by substantially maintaining the foam overrun and the foam density from the whipping step after spraying the foamed frosting solution through the spray nozzle; and optionally drying the applied foam to form a frosted food. In this approach, the foam density and overrun are formed in the mixing step and maintained through the spraying and generally not formed within the spray nozzle as with prior foamed solutions.

In other embodiments or approaches, the process of the previous paragraph may be combined with optional features and embodiments in any combination thereof including: wherein the frosting solution includes about 5 to about 95 percent sucrose, about 0.05 to about 3.5 percent foaming agent, about 50 to about 85 percent stabilizing agent, and about 5 to about 30 percent water; and/or wherein the whipping is sufficient to generate the foamed frosting solution having a density of greater than about 0.8 and less than about 1.25 grams per milliliter and/or an overrun of about 40 to about 60 percent; and/or wherein a density of the foam after the spraying is about 0.9 to about 1.3 gram per milliliter; and/or wherein an overrun of the foam after the spraying is about 30 to about 50 percent; and/or wherein the overrun of the foam after the spraying is about 70 to about 95 percent of the overrun before spraying; and/or wherein the spraying of the foamed frosting solution through the spray nozzle is at a pressure of about 40 to about 100 psi and an atomizer air pressure of about 20 to about 80 psi; and/or wherein the foaming agent includes gelatin, soy protein isolate, egg albumin, whey, carrageenan, alginates, xanthan gum, modified cellulose, and combinations thereof; and/or wherein the stabilizing agent includes sucrose, dextrose, fructose, starch hydrolysis products selected from corn syrup or brown rice syrup, maltodextrins, and combinations thereof; and/or wherein the stabilizing agent includes sucrose and maltodextrin; and/or wherein the stabilizing agent includes sucrose and maltodextrin in a ratio of about 1:0 to about 1:5; and/or wherein the spraying temperature of the frosted foam solution is about 160° F. to about 205° F.; and/or wherein the foamed frosting solution has a density of about 0.88 to about 1.2 grams per milliliter; and/or wherein a first mixture is prepared with a first portion of the water blended with the foaming agent and a second mixture is prepared with another portion of the water blended with the stabilizing agent and wherein the first mixture and the second mixture are blended prior to the whipping; and/or wherein the foaming agent is hydrated in the first mixture for about 10 to about 20 minutes prior to the blending with the second mixture; and/or wherein a temperature of the frosting solution during the whipping is about 190° F. to about 205° F.

In other approaches or embodiments, a coated comestible having a reduced sugar frosting is provided. As with the methods described above, the reduced sugar coating may have about 50 to about 60 percent less sugar than traditional frostings. In one approach, the coated comestible includes a comestible having a surface and a frosting on at least a portion of the comestible surface. The frosting is made by a (a) preparing a frosting solution including sucrose, a foaming agent, a stabilizing agent, and water; (b) whipping the frosting solution to generate a foamed frosting solution having a foam overrun and density thereof; (c) spraying the foamed frosting solution through a spray nozzle onto the surface of the comestible and maintaining an integrity of the foam through the spray nozzle by maintaining the foam overrun and the density from the whipping step after spraying the foamed frosting solution through the spray nozzle; and (d) optionally drying the applied foam to form a frosted food.

In other embodiments or approaches, the coated comestible of the previous paragraph may be combined with optional features and embodiments in any combination thereof including: wherein the comestible is selected from a flake, a granule, a particulate, a nugget, a biscuit, and combinations thereof; and/or wherein the comestible is a ready-to-eat flaked cereal; and/or wherein the frosting solution includes about 5 to about 95 percent sucrose, about 0.05 to about 3.5 percent foaming agent, about 50 to about 85 percent stabilizing agent, and about 5 to about 30 percent water; and/or wherein the whipping is sufficient to generate the foamed frosting solution having a density of greater than about 0.8 and less than about 1.25 grams per milliliter and/or an overrun of about 40 to about 60 percent; and/or wherein a density of the foam after the spraying is about 0.9 to about 1.3 gram per milliliter; and/or wherein an overrun of the foam after the spraying is about 30 to about 50 percent; and/or wherein the overrun of the foam after the spraying is about 70 to about 95 percent of the overrun before spraying; and/or wherein the spraying of the foamed frosting solution through the spray nozzle is at a pressure of about 40 to about 100 psi and an atomizer air pressure of about 20 to about 80 psi; and/or wherein the foaming agent includes gelatin, soy protein isolate, egg albumin, whey, carrageenan, alginates, xanthan gum, modified cellulose, and combinations thereof; and/or wherein the stabilizing agent includes sucrose, dextrose, fructose, starch hydrolysis products selected from corn syrup or brown rice syrup, maltodextrins, and combinations thereof; and/or wherein the stabilizing agent includes sucrose and maltodextrin; and/or wherein the stabilizing agent includes sucrose and maltodextrin in a ratio of about 1:0 to about 1:5; and/or wherein the spraying temperature of the frosted foam solution is about 160° F. to about 205° F.; and/or wherein the foamed frosting solution has a density of about 0.88 to about 1.2 grams per milliliter; and/or wherein a first mixture is prepared with a first portion of the water blended with the foaming agent and a second mixture is prepared with another portion of the water blended with the stabilizing agent and wherein the first mixture and the second mixture are blended prior to the whipping; and/or wherein the foaming agent is hydrated in the first mixture for about 10 to about 20 minutes prior to the blending with the second mixture; and/or wherein a temperature of the frosting solution during the whipping is about 190° F. to about 205° F.

DRAWINGS

Figure 2:
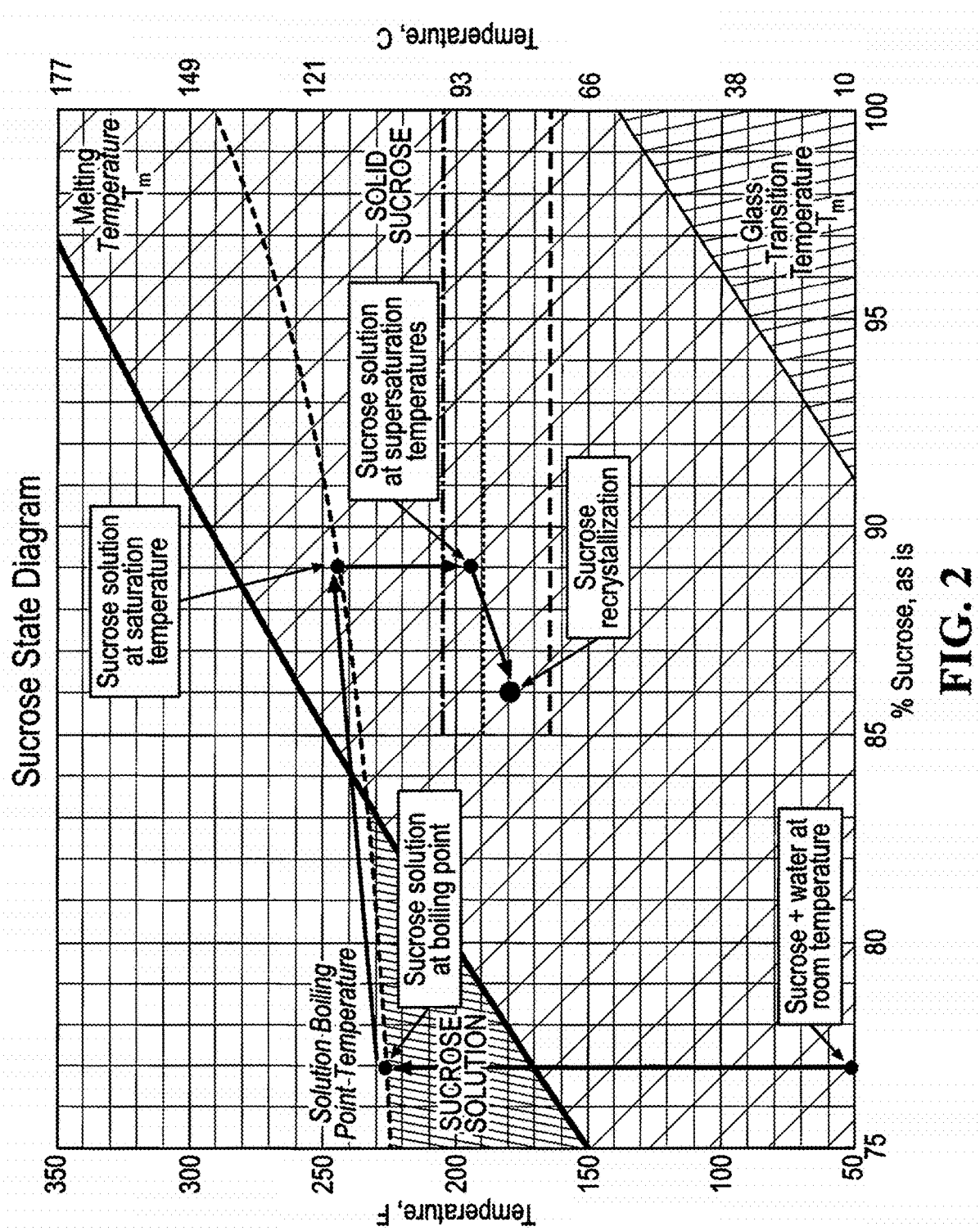

FIG. 1 includes inventive and comparative images of sprayed foams herein of different densities; and FIG. 2 is a sucrose state diagram with dynamic mapping for preparing stabilized foams.

DETAILED DESCRIPTION

Disclosed herein are methods for applying a reduced sugar coating to a comestible, such as a flake, granule, particulate, nugget, biscuit or the like discrete comestibles or other discrete food product pieces, in a manner that mimics the appearance of a full-sugar coated icing or frosting. The comestible may be a ready-to-eat cereal or breakfast cereal such as a flaked cereal piece. The unique methods herein mimic the appearance of a white, crystalized coating on the comestible or discrete food product piece even with reduced levels of sugar in the coating. In some approaches, the coatings herein have about 50 to about 60 percent less sugar than traditional coatings on frosted type cereals.

As discussed more below, a process for producing a reduced sugar coated food product is provided by first foaming or aerating a reduced-sugar solution to produce a foam having a stabilized density and/or level of overrun and then spray coating the foam to the food surface while substantially maintaining that density or level of foam/overrun through a spray head or other application nozzle. The spray applied foam mimics the appearance of a more conventional frosting or icing with less sugar. The methods herein are unique because rather than generating the foam at a spray nozzle or while spraying from the nozzle in a typical foaming process, the foam is first prepared before spraying and then the level of foam overrun and foam integrity is substantially maintained while spraying through the spray nozzle. This process is advantageous because it allows a reduced sugar solution to be applied to a comestible and resemble the white, opaque appearance of a traditional, full sugar coated product. The methods herein also permit a coating to achieve the desired white, opaque appearance without the need for substantial level of added whiteners or colorants. Some prior processes add artificial whiteners, such as titanium dioxide and other colorants, to impart the traditional white, opaque appearance to reduced sugar coatings.

The methods of the present disclosure use stabilized pre-foamed solutions that are subsequently sprayed as foam onto a comestible or other discrete food piece, such as RTE breakfast cereals such as flake, particulate, granulated, biscuit, and the like breakfast cereals. In one aspect, the solutions that are pre-foamed before spraying include select amounts of water, a foaming or whipping agent, and one or more stabilizing agents combined with reduced levels of sucrose. In some aspects, the foam has an overrun of about 40 to about 60 percent and that overrun is substantially maintained through the spraying nozzle so that the sprayed foam integrity is maintained with an overrun of about 30 to about 50 percent after being applied to the surface of the comestible.

Turning to more of the specifics, a foamed or aerated solution is prepared and then subsequently sprayed onto the surface of a food where the foaming or level of aeration is maintained through the spray nozzle. In one aspect, the pre-foamed solutions include a foaming or whipping agent, a foam stabilizing agent, a sweetener including sucrose, and water. As noted herein, several parameters are selected in order to maintain the foam integrity through the spraying process.

Foaming or Whipping Agent: In one aspect, the solution to be foamed includes a foaming or whipping agent. In one approach, the solution includes about 0.05 to about 3.5 percent foaming or whipping agent (in other approaches, about 0.5 to about 1.3 percent foaming or whipping agent). In other approaches, the solution may include a range of foaming agent from at least about 0.05, at least about 0.5, at least about 0.75 or at least about 1 to less than about 3.5, less than about 3, less than about 2.5, less than about 2, less than about 1.5 or less than about 1.3 percent. The foaming or whipping agents may include gelatin, soy protein isolate, egg albumen, whey, carrageenan, alginates, xanthan gum, modified cellulose (such as modified cellulose ethers) and combinations thereof.

Stabilizing Agent: The solution to be foamed further includes a foam stabilizing or foam stabilization agent. In one approach, the solution includes about 50 to about 90 percent stabilizing agent (in other approaches, about 80 to about 85 percent stabilizing agent). In some approaches, the solution includes a range of stabilizing agent from at least about 50, at least about 60, at least about 70, and at least about 80 percent to less than about 90, less than about 85, less than about 80, less than about 75, less than about 70, less than about 60, or less than about 55 percent. The stabilizing agent may be sucrose, dextrose, fructose, starch hydrolysis products (corn syrup, brown rice syrup, and the like), maltodextrin, and combinations thereof. Preferably, the stabilization agent is maltodextrin (such as a maltodextrin having a 2 to 62 DE) or combinations of maltodextrin and sucrose.

In some approaches, the stabilizing agent may be a combination of sucrose and another stabilizing agent noted above, such as maltodextrin. Preferably, the stabilizing agent is sucrose and maltodextrin. In such approaches, a stabilizing function of the foam is provided by the combination of sucrose and the other agent in a ratio of the sucrose to the other stabilizing agent of about 1:0 to about 1:5 and in other approaches, about 1:0.5 to about 1:5.

Water: The solution further include water and may include about 5 to about 30 percent water (in other approaches, about 10 to about 20 percent water, and in yet other approaches, about 12 to about 16 percent water). In one approach, a ratio of water to the foaming agent (e.g., gelatin or other agent noted above) is about 3:1 to 5:1, and in other approaches, about 3:1 to about 4:1, and in yet other approaches, about 3:1 to about 3.5:1. More water tends to result in a less stable foam and the increased water can migrate to the cereal base. Lower amounts of water tend to give a spongy appearance to the foamed coating.

In some approaches, the stabilizing agent or foaming agent (such as gelatin) is first hydrated in water as shown in the Examples below. Hydration temperature typically ranges from about 160° F. to about 170° F. and hydration may occur for about 10 to about 20 minutes optionally under gentle mixing. As shown in the Examples, the water may be added in stages such as in a first stage with the whipping agent and with a second stage with the stabilizing agent.

Sugar or other sweetener: The solutions include a reduced level of sugar compared to prior frostings or icings. In some aspects, the solutions include about 50 to about 60 percent less sugar than prior coatings. Sweeteners include sucrose, glucose, fructose, galactose, maltose, and lactose, and combinations thereof. Natural and artificial flavors and high intensity sweeteners may also be added. Preferably, the sweetener is sucrose. In some approaches the solutions include about 5 to about 95 percent sweetener such as sugar (in other approaches, about 80 to about 85 percent sweetener such as sugar). In other approaches, the solutions include sweetener in ranges from about 5, about 10, about 20, about 30, about 40, about 50, about 60, about 70, and about 80 to less than about 95, less than about 90, less than about 85, less than about 80, less than about 70, less than about 60, less than about 50, less than about 40, less than about 20.

As shown below in the Examples, the sucrose (with or without the other stabilizing agents) is preferably formulated into a syrup that is then added to the foaming agent solution and whipped. In some approaches, the sucrose syrup cooking temperature is about 235° F. to about 250° F., and preferably about 240° F. to about 245° F. The syrup may have a Brix of about 85 to about 90.

Foam: The stabilized foam solution, prior to spraying, typically has a foam overrun of about 40 to about 60 percent and/or a density greater than about 0.8 grams per milliliter and less than about 1.25 grams per milliliter and, in other approaches, about 0.88 to about 1.2 grams per milliliter. Density below this level generally has too much air and will appear too shiny when sprayed to a food surface so that the coated foam tends to have a painted rather than matte appearance. Foam densities above this level are unstable and will not maintain foam integrity through the spray nozzle. FIG. 1 shows effects of foam density on spray patters and quality.

In some approaches, a foam whipping temperature is between about 190 and about 205° F. as shown on the sucrose state diagram of FIG. 1. Lower or higher whipping temperatures will tend to form coarser foam due to bigger sugar crystals. In addition, higher whipping temperatures also destabilize the foam prior to spraying.

Once the foam is generated and stabilized, the foam is then sprayed through a spray nozzle. In some approaches, the spray nozzle includes an orifice of about 0.1 to about 0.5 inches and, in other approaches, about 0.1 to about 0.2 inches, and in further approaches, about 0.1 to about 0.15 inches. Fluid or foam pressures provided to the spray nozzle orifice are about 40 to about 100 psi, and in other approaches, about 50 to about 60 psi. Air may be used to atomize or spread the fluid or foam at it passes through the orifice, and atomization air pressure at the orifice are about 20 to about 80 psi, and in other approaches about 35 to about 45 psi. An exemplary spray nozzle may be a Binks automatic airspray gun (ITW Finishing Equipment) or the like spray nozzle. Preferred foam application temperatures need to be at or above the glass transition temperature of sucrose, which in the context of the present disclosure is at or above about 160° F. Below this temperature, the foam tends to set prior to spraying, which will clog spray lines and will not spray. Maintaining a foam temperature at or above this level is helpful, among other features, to maintain foam integrity through the spray nozzle.

Unique to the present disclosure is the ability to maintain the foam integrity through the spray coating application and spray nozzle. In some aspects, the foam has a select density and overrun substantially the same both before and after spraying. That is, the foam overrun before spraying is about 40 to about 60 percent and, after spraying, is maintained at about 30 to about 50 percent. In other approaches, the foam integrity is maintained because the overrun after spraying is about 70 to about 95 percent of the overrun before spraying. In other approaches, the foam density before spraying is about 0.88 to about 1.2 grams per milliliter and after spraying, the foam density is about 0.93 to about 1.27 grams per milliliter. Foam overrun is a percentage increase of the volume of the foam before and after whipping.

The foam may be whipped or aerated in conventional foaming equipment. Examples include a Stephan mixer, a Mondomix, an Oates mixer, or a fondant beater operated at an appropriate speed to generate the desired level of foam.

As noted above, the coating and foam solution is preferably free of colorants, whiteners, and other opaqueness or whiteness aids. By one approach, any of the above described embodiments, approaches, mixtures, methods, and/or solutions are free of titanium dioxide, hydrocolloids, and mixtures thereof. As used herein, free of, substantially free of, devoid of, or in the absence of generally means less than about 0.5 weight percent, in other approaches, less than about 0.1 weight percent, in yet further approaches, less than about 0.05 weight percent, and in yet other approaches, none. The methods and unique foam and foaming process describes herein achieves a frosted, icing-like appearance typically without the need for such additives. The foams herein provide a natural whitener and opacity to the select foam composition and density due, in part, to the foam air bubbles once coated.

Once sprayed, the coated comestible pieces are optionally dried. Prior to spraying, the foam solution generally has about 5 to about 30 percent moisture. After spraying and optional drying, the coating is about 1 to about 5 percent moisture. The optional drying may be conducted by heating at temperatures of about 180 to about 260° F. for about 10 to about 30 minutes. However, in some approaches, the foam is not dried if it is sprayed at temperatures and compositions, such as about 242° F. to about 247° F. and at about 85% to about 92% sucrose.

Turning to FIG. 2 for a moment, a transformation of the unique stabilized foamed solutions herein is shown on the sucrose state diagram. A state diagram is a mapping tool used to show changes in material properties at different temperatures and moisture contents. In the sucrose state diagram of FIG. 2, the melting point and glass transition temperatures of sucrose are plotted against the corresponding moisture contents. Other relevant properties, such as boiling point temperatures are also shown.

The transformation of sucrose in the methods herein to form a stabilized foam during the different stages of stabilized foam or fondant preparation is mapped in the sucrose state diagram. In the particular example shown in FIG. 2, about 77 weight percent sucrose is heated until the sucrose molecules melt at about 170° F. (the saturation temperature) to form a syrup and start boiling around 226° F. As water evaporate on further heating, the sucrose syrup solution becomes more concentrated. For the methods herein, heating the syrup to about 240° F. to about 250° F. or, in other approaches, about 245° F. (89% sucrose) was found to aid in forming a stabilized foam when the final foam or fondant is applied to systems not requiring further drying steps.

When the temperature of the foam is reduced below 245° F. after spraying to a food product surface, it becomes supersaturated and the sucrose molecules will recrystallize. Syrup temperatures between about 190° F. and about 205° F. were discovered to get the sugar crystal size distribution needed for the Frosted Mini Wheats fondant or foam or other coated flake, particulate, or RTE cereal. As other ingredients, like hydrated gelatin and maltodextrins, are added, the preferred mixture temperature may change. Maintaining the temperature between 190° F. and about 205° F. during mixing is helpful to obtain a foam and/or fondant that mimics the appearance of a traditional sugar coating when the foam/fondant is sprayed. In some cases, maintaining the temperature around about 160° F. to about 170° F. was preferred. If the foam temperature is not maintained within these select ranges during spraying, the sprayed coating may include a larger portion of sugar molecules that do not recrystallize and can form an amorphous glass that will lead to premature setting of the foam. In some approaches, however, the optimum range of process conditions (temperatures and moisture contents) listed above for making stabilized foam system will be dependent on the desired properties, e.g. small or large sugar crystals, foam glass transition temperature.

The practice and advantages of the disclosed methods may be demonstrated by the following Examples, which are presented for purposes of illustration and not limitation.

Unless indicated otherwise, all amounts, percentages, and ratios of this disclosure and Examples are by weight. Unless indicated otherwise by the context, percent overrun is volume percent.

EXAMPLES

Example 1

A frosted ready-to-eat (RTE) flaked breakfast cereal was prepared using a foamed, reduced sugar coating. This Example used gelatin as a foaming agent and granulated sucrose as a stabilizing agent. A ratio of water to gelatin was about 3.75.

A foam was prepared by first adding about 12 grams of gelatin (225 bloom, type B, 30 mesh) into about 45 grams of water. The gelatin was allowed to hydrate for about 10 minutes in a Stephan mixer.

Separately, a syrup was prepared by mixing about 800 grams of granulated sugar with about 240 grams of water and heating the mixture to about 245° F. The syrup was then cooled to about 190 to about 200° F. The cooled syrup was combined with the hydrated gelatin in the Stephan mixer and whipped for about 2 minutes at 1000 rpm. The mixing speed was then increased to about 1500 rpm and whipped for another 3 minutes for a total whipping time of about 5 minutes. The foam had a density of about 1.03 grams per milliliter.

Next, the foam was applied to a flaked breakfast cereal using a flocking gun (Binks, 95AFP, ITW Finishing Equipment) with a fluid/foam pressure of about 20 psi and an atomizer of about 10 psi. After spraying the foam had a density of about 1.09 grams per milliliter.

Example 2

Another frosted RTE flaked breakfast cereal was prepared using a foamed, reduced sugar coating. This Example used gelatin as a foaming agent and granulated sugar combined with maltodextrin as stabilizing agents. This Example had about 24 percent less sugar than Example 1. A ratio of water to gelatin was about 3.75.

A foam was prepared by first adding about 12 grams of gelatin (225 bloom, type B, 30 mesh) into about 45 grams of water. The gelatin was allowed to hydrate for about 10 minutes in a Stephan mixer.

Separately, a syrup was prepared by mixing about 800 grams of granulated sugar with about 240 grams of water and heating the mixture to about 245° F. The syrup was then cooled to about 190 to about 200° F. The cooled syrup was combined with the hydrated mixture in the Stephan mixer and whipped for about 2.5 minutes at 1500 rpm.

Next, a sugar and maltodextrin solution, prepared by mixing about 30 grams of sugar with about 400 grams of Maltodextrin (10DE) in about 150 grams of water, was then added to the whipped foam whereupon the foam was whipped for another 2.5 minutes at 1500 rpm for a total whipping time of about 5 minutes. The foam had a density of about 1.10 grams per milliliter Next, the foam was applied to a flaked breakfast cereal using the flocking gun of Example 1 at a pressure of about 20 psi and an atomizer of about 10 psi. After spraying the foam had a density of about 1.17 grams per milliliter.

Example 3

Yet another frosted RTE flaked breakfast cereal was prepared using a foamed, reduced sugar coating. This Example used modified cellulose as a foaming agent and granulated sugar combined with maltodextrin as stabilizing agents. This Example also had about 24 percent less sugar than Example 1. A ratio of water to gelatin was about 3.75.

A foam was prepared by first adding about 12 grams of modified cellulose ether (Methocel K3, Dow Chemical) into about 45 grams of water. The modified cellulose ether was allowed to hydrate for about 10 minutes in a Stephan mixer.

Separately, a syrup was prepared by mixing about 575 grams of granulated sugar with about 200 grams of water and then heated to about 245° F. The syrup was then cooled to about 190 to about 200° F. The cooled syrup was combined with the Methocel mixture in the Stephan mixer and whipped for about 2.5 minutes at 1500 rpm.

Next, a sugar and maltodextrin solution, prepared by mixing about 30 grams of sugar with about 400 grams of Maltodextrin (10DE) in about 150 grams of water, was then added to the whipped foam whereupon the foam was whipped for another 2.5 minutes at 1500 rpm for a total whipping time of about 5 minutes. The foam had a density of about 0.90 grams per milliliter before spraying.

Next, the foam was applied to a flaked breakfast cereal using the flocking gun of Example 1 at a pressure of about 20 psi and an atomizer of about 10 psi. After spraying the foam had a density of about 0.96 grams/milliliter.

Example 4

A frosted wheat biscuit breakfast cereal was prepared using a foamed, reduced sugar coating. This Example used gelatin as a foaming agent and granulated sugar combined with brown rice syrup as stabilizing agents. A ratio of water to gelatin was about 3.75.

A foam was prepared by first adding about 12 grams of gelatin (225 bloom, type A, 30 mesh) into about 45 grams of water. The gelatin was allowed to hydrate for about 10 minutes in a Stephan mixer at about 167° F. About 16 grams of brown rice syrup (42 DE) was then added to the solution.

Separately, a syrup was prepared by mixing about 800 grams of granulated sugar with about 240 grams of water and heating the mixture to about 245° F. The syrup was then cooled to about 190 to about 200° F. The cooled syrup was combined with the hydrated gelatin and brown rice syrup mixture in the Stephan mixer and whipped for about 2 minutes at 1000 rpm. The mixing speed was then increased to about 1500 rpm and whipped for another 3 minutes for a total whipping time of about 5 minutes. The foam had a density of about 1.22 gram per milliliter.

Next, the foam was sprayed to a wheat biscuit breakfast cereal (Mini Wheats, Kellogg's) using the flocking gun of Example 1 at a pressure of about 20 psi and an atomizer of about 10 psi. After spraying the foam had a density of about 1.29 grams per milliliter.

Example 5

Yet another frosted wheat biscuit breakfast cereal was prepared using a foamed, reduced sugar coating. This Example used gelatin as a foaming agent and granulated sugar combined with maltodextrin as stabilizing agents. A ratio of water to gelatin was about 3.75.

A foam was prepared by first adding about 12 grams of gelatin (225 bloom, type B, 30 mesh) into about 45 grams of water. The gelatin was allowed to hydrate for about 10 minutes in a Stephan mixer.

Separately, a syrup was prepared by mixing about 800 grams of granulated sugar with about 240 grams of water and heating to about 245° F. The syrup was then cooled to about 190 to about 200° F. The cooled syrup was combined with the hydrated gelatin in the Stephan mixer and whipped for about 2.5 minutes at 1500 rpm.

Next, about 400 grams of Maltodextrin (10DE) was added to the whipped foam whereupon the foam was whipped for another 2.5 minutes at 1500 rpm for a total whipping time of about 5 minutes. The foam had a density of about 0.80 grams per milliliter.

Next, the foam was applied to a biscuit cereal (Mini Wheats, Kellogg's) using the flocking gun of Example 1 at a pressure of about 20 psi and an atomizer of about 10 psi. After spraying the foam had a density of about 0.85 grams per milliliter.

Example configurations are provided above so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A process for producing a sugar coated food product with a frosted-like coating, the process comprising:

preparing a frosting solution including a foaming agent, a stabilizing agent including a blend of sucrose and maltodextrin in a weight ratio of the sucrose to the maltodextrin of about 1:0.5 to about 1:5, and water by (i) preparing a first mixture including a first portion of the water blended with the foaming agent and (ii) preparing a separate, second mixture of another portion of the water blended with at least a portion of the sucrose and heating the second mixture to a temperature of about 240 to about 250° F. and then cooling the second mixture to about 190 to about 205° F. (iii) blending the first mixture and the second mixture at a temperature of about 190 to about 205° F. to form the frosting solution; (iv) whipping the frosting solution a first time at a temperature of about 190 to about 205° F.; and (v) after whipping the first time, adding the maltodextrin and any remaining sucrose to the whipped frosting solution;

whipping the frosting solution and the maltodextrin blend a second time at a temperature of about 190 to about 205° F. to generate a foamed frosting solution having a foam overrun and density thereof, wherein the second whipping is sufficient to generate the foamed frosting solution before spraying with a density of greater than about 0.8 and less than about 1.25 grams per milliliter and an overrun of about 40 to about 60 percent;

spraying the foamed frosting solution at a solution temperature of about 160 to about 205° F. through a spray nozzle onto the surface of a food product and maintaining an integrity of the foam through the spray nozzle by maintaining the foam overrun and the density from the whipping step after spraying the foamed frosting solution through the spray nozzle, wherein a density of the foam after the spraying is about 0.9 to about 1.3 gram per milliliter; and optionally drying the applied foam to form a frosted food.

2. The process of claim 1, wherein the frosting solution includes about 5 to about 95 percent sucrose, about 0.05 to about 3.5 percent foaming agent, about 50 to about 85 percent stabilizing agent, and about 5 to about 30 percent water.

3. The process of claim 1, wherein an overrun of the foam after the spraying is about 30 to about 50 percent.

4. The process of claim 3, wherein the overrun of the foam after the spraying is about 70 to about 95 percent of the overrun before spraying.

5. The process of claim 1, wherein the spraying of the foamed frosting solution through the spray nozzle is at a foam solution pressure of about 40 to about 100 psi and an atomizer air pressure of about 20 to about 80 psi.

6. The process of claim 1, wherein the foaming agent is selected from gelatin, soy protein isolate, egg albumin, whey, carrageenan, alginates, xanthan gum, modified cellulose, and combinations thereof.

7. The process of claim 1, wherein the foamed frosting solution has a density of about 0.88 to about 1.2 grams per milliliter.

8. The process of claim 1, wherein the foaming agent is hydrated in the first mixture for about 10 to about 20 minutes prior to the blending with the second mixture.

* * * * *